Figure 1:
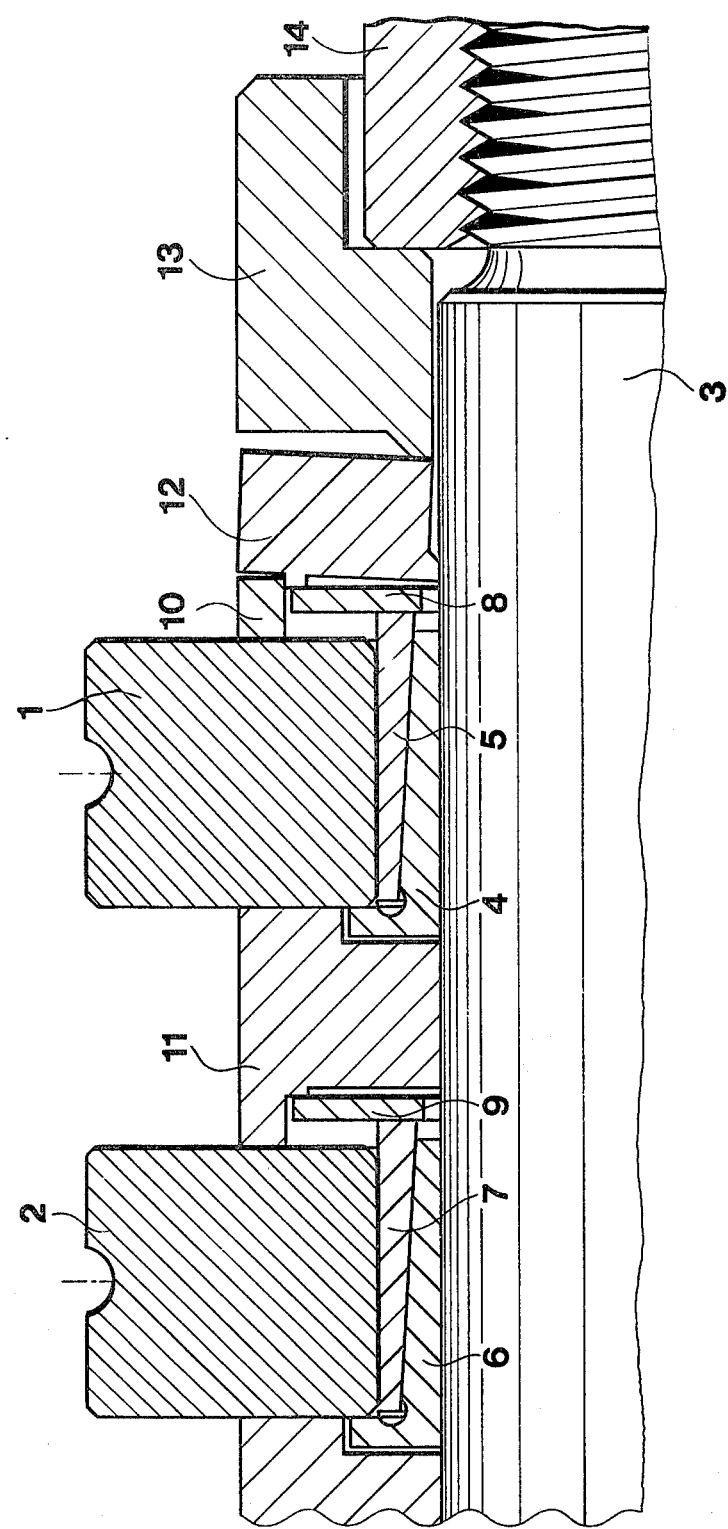

United States Patent [19]

Giege et al.

[11] 4,208,147

[45] Jun. 17, 1980

[54] VARIABLY TENSIONED ROLL-TO-SHAFT CLAMPING MEANS

[75] Inventors: Sture Giege, Spanga; Torgny C. B. Lagerqvist, Enskede, both of Sweden

[73] Assignee: Sandvik Aktiebolag, Sandviken, Sweden

[21] Appl. No.: 888,615

[22] Filed: Mar. 21, 1978

[51] Int. Cl.² ................................................ B60B 9/00
[52] U.S. Cl. ........................................ 29/117; 403/370
[58] Field of Search ............... 403/367, 368, 369, 370, 403/372, 373, 374, 16; 72/238; 29/117, 129

[56] References Cited

U.S. PATENT DOCUMENTS

| 1,065,069 | 6/1913 | Noble | 403/16 X |
| 2,755,093 | 7/1956 | Peter et al. | 403/369 X |
| 2,816,452 | 12/1957 | McCloskey | 403/369 X |
| 2,956,826 | 10/1960 | Nord | 403/368 |
| 3,112,116 | 11/1963 | Seitz | 403/370 X |
| 3,957,381 | 5/1976 | Schafer | 403/374 |

FOREIGN PATENT DOCUMENTS 317469  7/1929  United Kingdom .................... 403/367

Primary Examiner—Wayne L. Shedd
Attorney, Agent, or Firm—Burns, Doane, Swecker & Mathis

[57] ABSTRACT

A roll device includes a roll shaft and at least one roll ring mounted on the roll shaft. A lock means is securable to the roll shaft. A centering element is disposed between the roll ring and the roll shaft to center the roll ring. A first resilient element is axially interposed between the lock means and the centering element. A second resilient element is axially interposed between the lock means and the roll ring. The lock means applies axial force to the first and second resilient elements to position the centering element relative to the roll ring and roll shaft, and clamp the roll ring to the roll shaft for common rotation therewith. The spring rates of the first resilient element can be made less than that of the second resilient element to regulate the relative amount of axial forces applied to these elements.

16 Claims, 2 Drawing Figures

VARIABLY TENSIONED ROLL-TO-SHAFT CLAMPING MEANS

This invention relates to an arrangement in a roll assembly.

When mounting a roll ring on a roll shaft different types of joints for transmitting the torsional moment from shaft to ring have up to now been used which joints have not been satisfactory.

In one joint a conical centering sleeve is forced in between a roll ring and a roll shaft whereby the torsional moment is transmitted to the roll ring by this clamping-joint. The advantage of this joint is that the roll ring and roll shaft can be manufactured with great margins and that the roll ring can easily be exchanged. A troublesome drawback, however, is that, when the conical sleeve is forced in between the roll ring and roll shaft, so great tensile stresses are introduced into the roll ring, which in most cases is made of cemented carbide, that it bursts.

In another type of joint the roll ring is forced onto the shaft, whereby the grip shall be so great that effective contact is secured and relative movement between ring and shaft is eliminated. A grip that is great enough for transmission of moment is difficult and expensive to arrange owing to the fact that narrow tolerances on roll ring and roll shaft are required. Other drawbacks are that it is difficult to mount the roll ring onto and to dismount it from the shaft, and that there is a risk that the brittle roll ring bursts when forcing it onto the shaft.

In a third type of joint the roll ring is prevented to rotate relatively the roll shaft by axial clamping, whereby the axial force is kept within fixed limits by applying a spring element in connection to the roll ring. The drawbacks of this joint is that it requires narrow tolerances on roll ring and roll shaft which makes the production of roll ring and roll shaft expensive and which makes it difficult to mount the roll ring onto and to dismount it from the shaft.

The present invention relates to a joint that eliminates the drawbacks mentioned above and which allows large torsional moments to be transmitted, and wide tolerances to be used. Thus, the production costs for the roll ring and roll shaft will be relatively low. Moreover, the joint allows a quick exchange of roll rings, since partly the roll ring is easy to dismount, partly easy to mount.

Figure 2:
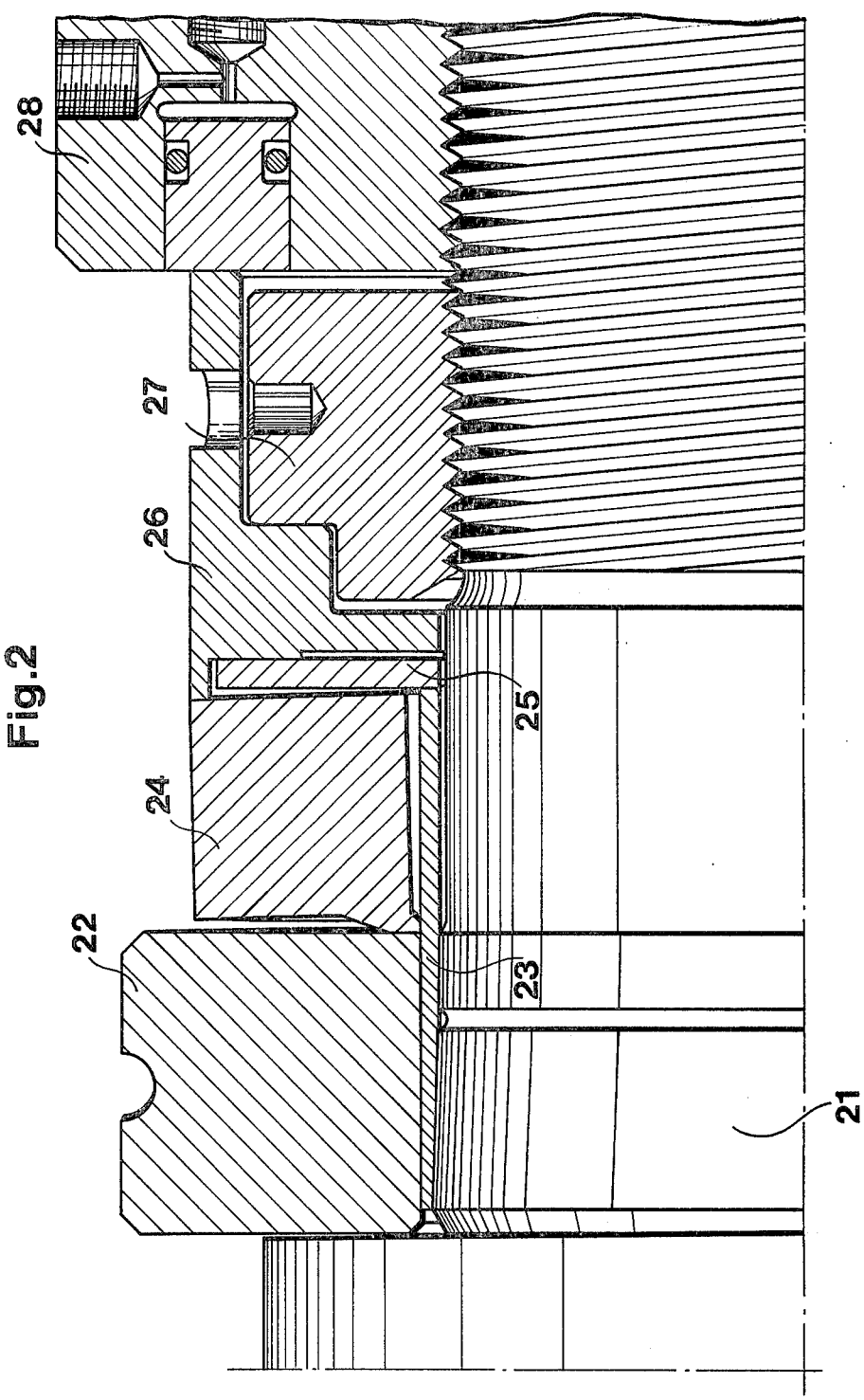

The invention shall be described more closely below with reference to the accompanying drawings, in which FIG. 1 shows in longitudinal section one embodiment of the invention and FIG. 2 shows another embodiment of the invention in longitudinal section.

Referring now to FIG. 1 there are shown two roll rings 1,2 (three or more roll rings can of course be mounted on the roll shaft) mounted on a roll shaft 3, whereby the clearances are so great that both mounting and dismounting of the roll rings can be made quickly and simply by hand. Owing to these great clearances the roll joint must be provided with centering elements which are in the form of two pairs of wedge-type centering sleeves 4,5 or 7 bearing against each other and mounted between the roll ring and roll shaft. Thanks to the fact that two or several wedge-type centering sleeves are used the roll shaft or the inner surface of the roll ring does not have to be conical but can be straight. Bearing against one of the centering sleeves 5 or 7 4,6 of each pair is a resilient element 8, or 9 having a small spring force. Radially outside the element 8 and bearing against the roll ring 1 there is positioned a distance ring 10. Another distance ring 11 is positioned between the two roll rings 1 and 2 and has one part bearing against the upper part of the resilient element 9. Another resilient element 12 having very great spring force is positioned axially outside the resilient element 8 and the distance ring 10. The resilient element 12 has an upper part bearing against the distance ring 10 and another part bearing against an upper part of the resilient element 8. Axially outside the resilient element 12 and bearing against the same there is positioned a press ring 13 which partially surrounds a mechanical lock nut 14 acting on the press ring 13. In order to effect the axial press force on the roll joint a suitable hydraulic press element is applied against the press ring. When the mechanical lock nut 14 has been tightened to full contact with the press ring 13, the outer axial force can be released, whereafter the roll joint is ready for use. In connection herewith it ought to be said that the distance beween the lower parts of the two resilient elements 8 and 12 is so large that in spite of the full tightening of the lock nut 14 the parts do not touch each other. In FIG. 2 there is shown another embodiment of the roll joint. A roll ring 22 is mounted on a roll shaft 21 whereby a centering element in the form of a conical sleeve 23 is mounted between the ring and shaft. In this case that part of the shaft that is in contact with the sleeve 23 is tapered in order to provide a good contact surface for the conical sleeve 23. Outside the sleeve 23 and bearing against the roll ring 22 there is placed a resilient element, for instance a belleville washer 24 having very great spring force. Bearing against the centering sleeve 23 there is placed another resilient element, for instance a cup spring 25 having a small spring force. The resilient element 25 has not the same radial extension as the resilient element 24 and is positioned axially outside the same. Bearing against the two resilient elements there is a press ring 26, which wholly or partially surrounds a mechanical lock nut 27. In order to effect the axial press force a hydraulic nut or a similar device is used. When the mechanical lock nut 27 in a suitable way has been tightened to full contact with the press ring 26, the outer axial force can be released, whereafter the roll joint is ready for use.

When dismounting the roll ring an axial force is applied against the press ring 26 by member 28, whereby the locking nut can be released and threaded off. After that the press ring 26 and the resilient elements 24 and 25 are taken off. Now the centering sleeve 23 and the roll ring 22 can be removed in a suitable way for instance by pumping pressure oil into the gap between shaft 21 and centering sleeve 23.

The important thing in this invention is that the centering sleeve (or sleeves) can be forced in between the shaft and the ring with a fixed force which is small in relation to the axial clamping force on the roll ring and, which is transmitted from the press ring by the first resilient element at the same time as the axial clamping force from the press ring is applied on the roll ring by the second resilient element, the spring force of which is many times greater than that of the first element. By choosing resilient elements with different spring force the clamping forces on the centering sleeve and the roll ring can be regulated.

Thus, the mounting is made in one operation, whereby axial clamping of the roll ring for transmission of the torsional moment is obtained at the same time as the roll ring is centered and gets support at its inner diameter by the centering sleeve without undesirable and injurous tensile stresses being introduced into the roll ring.

The invention is of course not limited to the described embodiments but can be modified within the scope of the following claims. Thus, other resilient elements than cup springs and belleville washers can be used.

We claim:

1. A roll device comprising:
   a roll shaft,
   at least one roll ring mounted on the roll shaft,
   a lock member securable to the roll shaft,
   centering means interposed radially between the roll ring and the roll shaft to radially center the roll ring,
   a first resilient spring element arranged to resiliently transmit axial forces from said lock means to said centering means to radially center said roll ring,
   a second resilient spring element arranged to resiliently transmit axial forces from said lock means to said roll ring to axially clamp the latter.

2. Device according to claim 1, wherein the centering means comprises two wedge-shaped centering sleeves bearing against one another.

3. Device according to claim 1, wherein the centering means comprises a single conical sleeve.

4. Device according to claim 1, wherein the first resilient spring element comprises a cup spring having a smaller spring force than that of the second resilient spring element.

5. Device according to claim 1, wherein the second resilient spring element comprises a belleville washer having a larger spring force than that of the first resilient spring element.

6. Device according to claim 1, wherein the lock member comprises a threaded lock nut securable to the ring shaft and a press ring is axially interposed between the resilient spring elements on the one hand and the lock nut on the other hand.

7. Device according to claim 6, wherein the press ring includes first and second portions, said first portion acting on the first resilient spring element at the same time that the second portion acts on the second resilient spring element.

8. Device according to claim 1 further including a press ring disposed between the lock member and the second resilient element and bearing against only the second of the resilient spring elements.

9. Device according to claim 1, further including a second roll ring and a centering element therefor, a distance ring axially interposed between the roll rings, another first spring resilient element axially interposed between the distance ring and the last-named centering element, the distance ring including a first portion for engaging the other first resilient spring element and a second portion for engaging the second roll ring.

10. A device according to claim 1 wherein at least one of said spring elements receives and transmits at least some axial forces independently of the other spring element.

11. A device according to claim 10 wherein said at least one spring element has a larger spring force than said first spring element.

12. A device according to claim 10 wherein both of said spring elements receive and transmit axial forces independently of each other.

13. A device according to claim 8 wherein said second spring element is positioned axially outside of said first spring element and has a first portion acting on the first spring element and a second portion acting on a distance ring positioned radially outside of the first spring element.

14. A device according to claim 1 wherein said second spring element is disposed axially outside of said ring roll.

15. A device according to claim 1 wherein said second spring permits limited axial displacement of said roll ring during shaft rotation.

16. A device according to claim 1 wherein said second spring extends radially beyond the centering means.

* * * * *